(12) United States Patent
Lee

(10) Patent No.: US 7,566,398 B2
(45) Date of Patent: Jul. 28, 2009

(54) WATER FILTERING DEVICE

(75) Inventor: Dong-Won Lee, Cheonan-si (KR)

(73) Assignee: Novita Co., Ltd. (KR)

( * ) Notice: Subject to any disclaimer, the term of this patent is extended or adjusted under 35 U.S.C. 154(b) by 339 days.

(21) Appl. No.: 11/481,506

(22) Filed: Jul. 6, 2006

(65) Prior Publication Data

US 2007/0181480 A1   Aug. 9, 2007

(30) Foreign Application Priority Data

Feb. 9, 2006   (KR)   ....................... 20-2006-0003701

(51) Int. Cl.
*C02F 1/58*   (2006.01)
(52) U.S. Cl. .................. 210/281; 210/282; 210/286; 210/472; 261/5; 261/DIG. 46
(58) Field of Classification Search ............... 210/281, 210/282, 284, 286–289, 436, 457, 458, 472, 210/285; 261/5, 6, DIG. 46
See application file for complete search history.

(56) References Cited

U.S. PATENT DOCUMENTS 1,430,950 A * 10/1922 Crandall ..................... 210/266
4,687,577 A *  8/1987 Reuter et al. ................. 210/288
4,724,104 A *  2/1988 Kim ............................... 261/4
6,245,230 B1 * 6/2001 Ricci ........................... 210/232

FOREIGN PATENT DOCUMENTS

| DE | 102004049877 | 4/2006 |
|----|--------------|--------|
| KR | 2001-0052879 | 6/2001 |
| KR | 10-2004-0047051 | 6/2004 |

OTHER PUBLICATIONS

German Office action dated Nov. 19, 2007; German application No. 10 2006 038 260.9. All references cited in the foreign Office action and not previously submitted are listed above.

* cited by examiner

*Primary Examiner*—Matthew O Savage
(74) *Attorney, Agent, or Firm*—Cantor Colburn LLP

(57) ABSTRACT

Provided is a water filtering device for a humidifier capable of increasing the filling amount of an ion exchange resin by including a separate inner cylinder having upper and lower diameters that are different from each other, increasing adsorption and removal efficiency of mineral components contained in water by taking a long ionic bonding time between the water and the ion exchange resin, and effectively preventing scales of the mineral components from being extracted by heating a heater to prevent malfunction of the heater or pipes.

14 Claims, 4 Drawing Sheets

WATER FILTERING DEVICE

CROSS-REFERENCE TO RELATED APPLICATION

This application claims priority to and the benefit of Korean Utility Model Application No. 20-2006-0003701, filed Feb. 9, 2006, the disclosure of which is incorporated herein by reference in its entirety.

BACKGROUND OF THE INVENTION

1. Field of the Invention

The present invention relates to a water filtering device for a humidifier and, more particularly, to a water filtering device capable of inducing ionic bonding between water and an ion exchange resin for a sufficient time to increase filtration performance of a water filter.

2. Description of the Related Art

As is well known, tap water used in a humidifier mainly contains mineral components such as magnesium ($Mg^{2+}$), calcium ($Ca^{2+}$), and so on in an ionized state.

Such mineral components (mainly $Ca^{2+}$ and $Mg^{2+}$) may be extracted from tap water in the form of scales sticking to the heater or inner pipes when the tap water is heated. When the stuck mineral scales are left as they are, the heater may overheat or the pipes may clog and cause malfunction of the humidifier. Therefore, the scales of mineral components should be previously removed.

However, since the scales of the mineral components are hard as stone and securely stuck to the humidifier, it is very difficult to remove them.

In addition, the scales of mineral components may be formed of positive ion carbonate, hydroxide or oxide of Ca, Mg, Na, K, Fe, Cu, and so on, and are mainly formed of a carbonate or hydroxide of Ca and Mg, specifically, calcium carbonate, magnesium carbonate, and magnesium hydroxide.

In order to prevent the scales of mineral components from forming, Korean Patent Application No. 2000-7014218 (hereinafter, referred to as conventional art 1) and Korean Patent Registration No. 462227 (hereinafter, referred to as conventional art 2) disclose technology of filling a water filter with an ion exchange resin for a humidifier to adsorb the mineral components through ionic bonding between water and the ion exchange resin, thereby removing the mineral components.

In conventional art 1 and 2, the water filter filled with the ion exchange resin is installed in a storage tank, and water in the storage tank can always be replaced by an equal volume of air, so that the inside of the storage tank always stays at atmospheric pressure enabling the water to be smoothly supplied to a heating device.

However, the water filter of conventional art 1 has a structure in which an inner cylinder 2 and a partitioned cylinder 3 in a case 1 are incorporated in one body with the case 1 through injection molding to provide an air flow path A, as shown in FIG. 1. As a result, an inner space B provided between the inner cylinder 2 and the partitioned cylinder 3 must have a fixed spatial volume, in the step of manufacturing the water filter.

Specifically, while the water entering the water filter should be discharged through the outer space C and the inner space B of the case 1 without mineral components, since the inner space B of conventional art 1 is too small due to the inner cylinder 2, the amount of ion exchange resin that it can accommodate is limited. Therefore, ionic bonding between the water and the ion exchange resin is performed for a short time, and adsorption and removal of the mineral components in the water cannot be perfectly performed. As a result, the scales of the mineral components are extracted by heating the heater, and the extracted scales of the mineral components are stuck to the heater or pipes, causing the heater to overheat or the pipes to clog or malfunction.

In addition, in conventional art 2, in order to more readily exchange the ion exchange resin than in conventional art 1, a case 1 and an upper cap 4 are threadedly engaged with each other. However, since an inner cylinder 2 and a partitioned cylinder 3 in the case 1 are also incorporated into one body with the case 1 through injection molding, the same problems as in conventional art 1 are generated.

SUMMARY OF THE INVENTION

In order to solve the foregoing and/or other problems, it is an object of the present invention to provide a water filtering device enabling increase of the amount of an ion exchange resin used. The water filtering device includes a separate inner cylinder having upper and lower diameters that are different from each other. Thus, the water filtering device more efficiently adsorbs and removes mineral components contained in water by taking a long ionic bonding time between the water and the ion exchange resin, and effectively prevents scales of the mineral components from being formed during heating and causing malfunction of the heater or pipes.

Additional aspects and advantages of the present invention will be set forth in part in the description which follows and, in part, will be obvious from the description, or may be learned by practice of the invention.

The foregoing and/or other aspects of the present invention may be achieved by providing a water filtering device including a water filter for a humidifier having a cylindrical case, and an upper cap for covering an upper part of the case, an ion exchange resin being filled in the case such that water filled in a reservoir of the humidifier is ion-bonded with the ion exchange resin, vaporized, and discharged into a room, characterized in that:

a step portion for fitting the upper cap is formed on an upper surface of the case;

the case includes an inner cylinder and a partitioned cylinder to divide an overall space into an inner space for filling the ion exchange resin and an outer space;

an inlet port having an insert net is formed at a lower peripheral surface of the case to enable the water to enter the outer space;

a discharge port is formed at a lower inner central part of the case to allow the water entering through the inlet port to be discharged therethrough, the water being ion-bonded with the ion exchange resin;

the discharge port has a ring-shaped first fitting groove; and the inner cylinder is separately formed to allow its lower part to be fitted in the first fitting groove.

In accordance with another aspect of the present invention, the step portion has hooks spaced by a predetermined interval to prevent separation of the upper cap fitted therein.

In accordance with still another aspect of the present invention, the upper cap has grooves formed at an inner surface, corresponding to the hooks.

In accordance with yet another aspect of the present invention, the upper cap has an air hole formed at an inner center thereof, and a ring-shaped second fitting groove, into which an upper part of the inner cylinder is fitted, around the air hole.

In accordance with yet another aspect of the present invention, the first fitting groove has a diameter larger than the second fitting groove.

In accordance with another aspect of the present invention, the inner cylinder is divided into three stages of cylindrical parts having diameters different from one another, a first stage of cylindrical part is disposed at its lower side to be fitted in the first fitting groove to form a fluid path having an insert net for guiding water entering the inner space to the discharge port, a second stage of cylindrical part is disposed at its center and has a diameter smaller than the first stage of cylindrical part to increase the filling amount of the ion exchange resin into the inner space, and a third stage of cylindrical part is disposed at its upper part and has a diameter smaller than the second stage of cylindrical part to be fitted in the second fitting groove.

In accordance with yet another aspect of the present invention, the partitioned cylinder includes guide ribs extending toward the case and the inner cylinder in a normal direction, and guiding engagement with the inner cylinder.

In accordance with yet another aspect of the present invention, the first stage of cylindrical part includes guide projections for guiding the guide ribs of the portioned cylinder so that the inner cylinder is readily inserted into the partitioned cylinder to prevent rotation of the inner cylinder on its insertion.

In accordance with yet another aspect of the present invention, ring-shaped packing members formed of rubber or soft synthetic resin are inserted into the first and second fitting grooves.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE INVENTION

Reference will now be made in detail to the embodiments of the present invention, examples of which are illustrated in the accompanying drawings.

Figure 1:
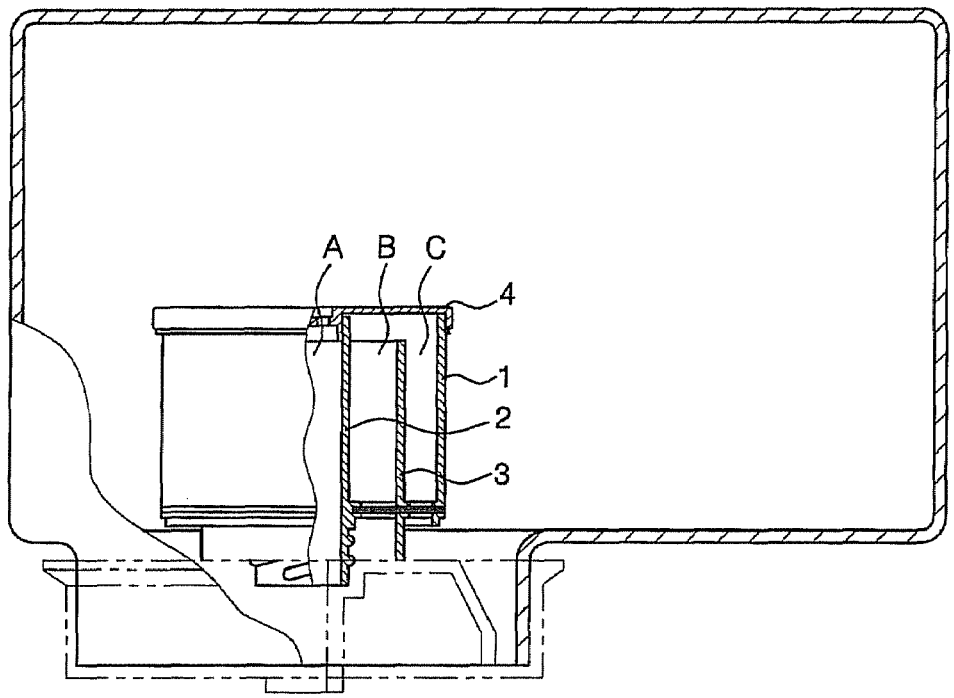
FIG. 1 is a cross-sectional view of a conventional water filtering device installed in a humidifier.
Figure 2:
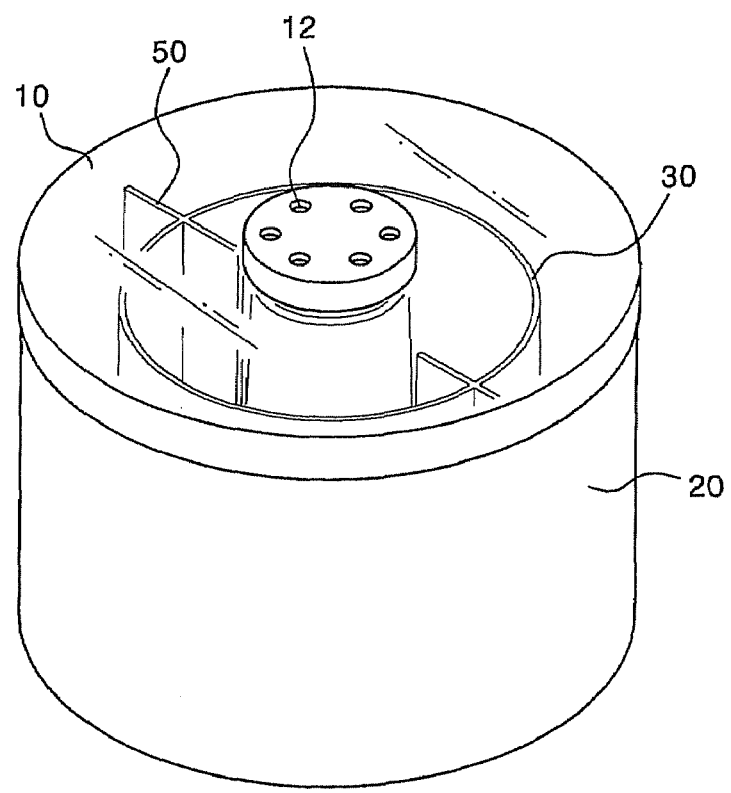
FIG. 2 is a perspective view of a water filtering device in accordance with an embodiment of the present invention.
Figure 3:
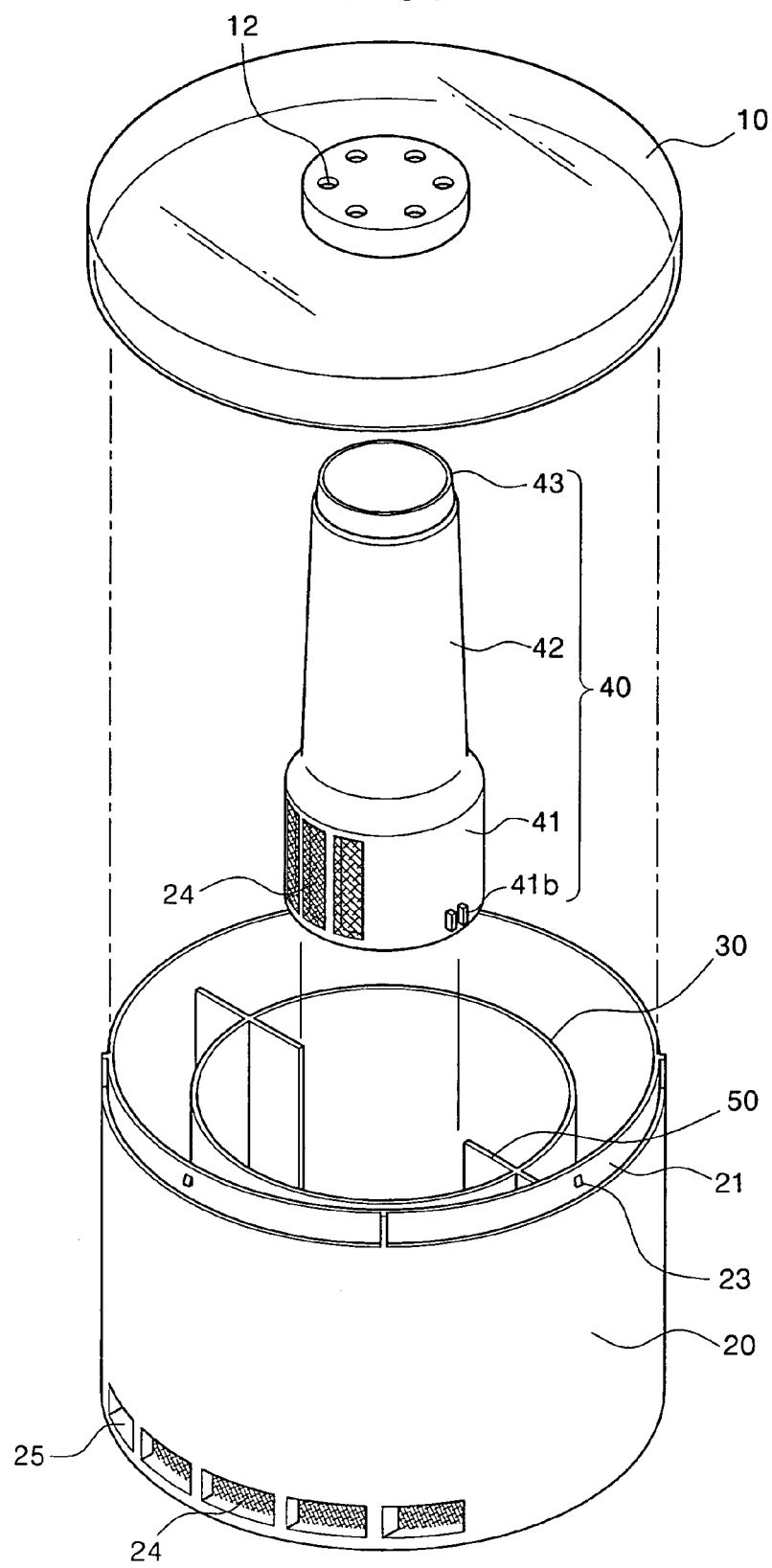
FIG. 3 is an exploded perspective view of a water filtering device in accordance with an embodiment of the present invention.
Figure 4:
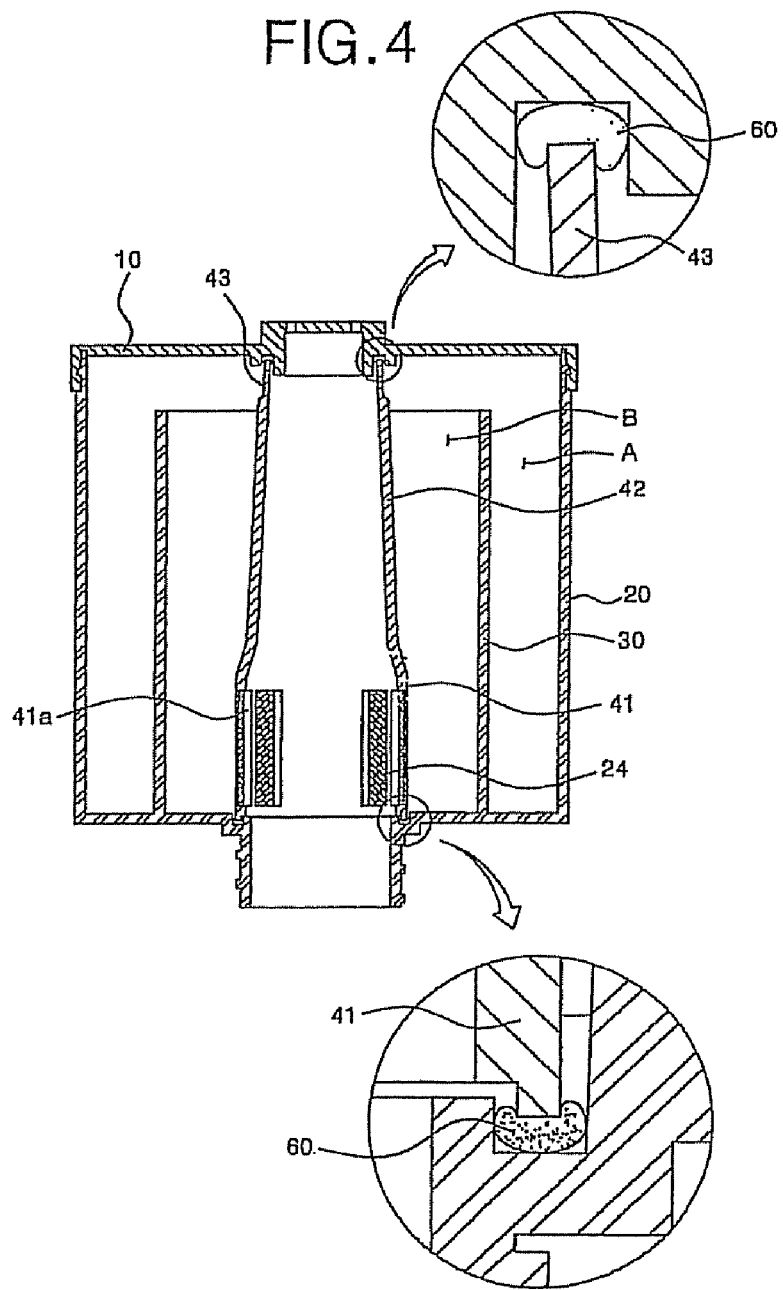
FIG. 4 is a cross-sectional view of a water filtering device in accordance with an embodiment of the present invention.
Figure 5:
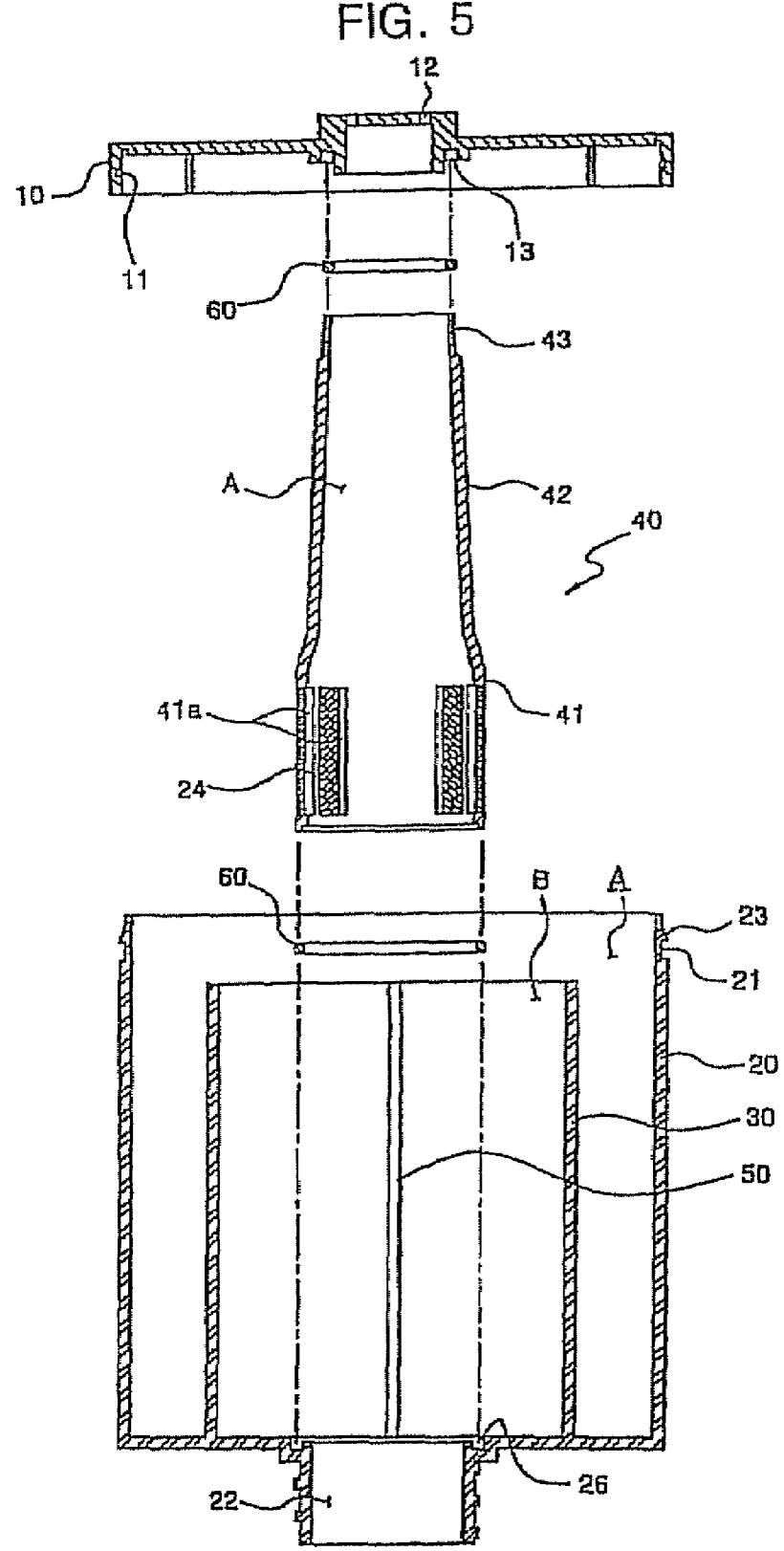
FIG. 5 is an exploded cross-sectional view of a water filtering device in accordance with an embodiment of the present invention.

FIG. 2 is a perspective view of a water filtering device in accordance with an embodiment of the present invention. FIG. 3 is an exploded perspective view of a water filtering device in accordance with an embodiment of the present invention. FIG. 4 is a cross-sectional view of a water filtering device in accordance with an embodiment of the present invention. FIG. 5 is an exploded cross-sectional view of a water filtering device in accordance with an embodiment of the present invention.

As shown in FIGS. 2 to 5, a water filtering device in accordance with an embodiment of the present invention includes an upper cap 10, a case 20, a partitioned cylinder 30, and an inner cylinder 40.

The upper cap 10, fitted on an upper side of the case 20, includes a predetermined number of grooves 11 disposed at an inner periphery surface by a predetermined interval, an air hole 12 disposed at its center, and a ring shaped second fitting groove 13 disposed around the air hole 12 so that an upper part of the inner cylinder 40 is fitted therein.

At this time, a ring shaped packing member 60 formed of rubber or soft synthetic resin is inserted into the second fitting groove 13 to prevent leakage and securely maintain the fitted state therebetween when the upper cap 10 is fitted on the upper part of the inner cylinder 40.

The case 20 has a step portion 21 at its upper part to be fitted in the upper cap 10, and the step portion 21 includes a predetermined number of hooks 23 corresponding to the grooves 11 to prevent separation of the upper cap 10 when the upper cap 10 is fitted on the case 20.

In addition, inlet ports 25 having each insert net 24 are formed at a lower peripheral surface of the case 20 to enable water to enter thereinto, a discharge port 22 is formed at a center of a lower surface of the case 20 so that the water entering through the inlet port 25 is ion-bonded to the ion exchange resin and discharged. A ring shaped first fitting groove 26 is formed at the lower surface of the case 20, around the discharge port 22.

At this time, another ring shaped packing member 60 formed of rubber or soft synthetic resin is inserted into the first fitting groove 26 to prevent leakage and maintain good sealing between them when the lower part of the inner cylinder 40 is fitted in the second fitting groove 26.

In this process, the first fitting groove 26 has a diameter larger than that of the second fitting groove 13 so that the diameter of the inner cylinder 40 can be varied to increase the filling amount of the ion exchange resin.

The partitioned cylinder 30 which is incorporated in one body with the case 20 is disposed in the case 20 to define an outer space A toward the case 20 and an inner space B toward the inner cylinder 40.

At this time, guide ribs 50 extending perpendicular to each other from the partitioned cylinder 30 toward the case 20 and the inner cylinder 40 are incorporated in one body with the partitioned cylinder 30 to guide the inner cylinder 40.

The inner cylinder 40 is fitted in the first fitting groove 26 at its lower part to be separated from the case 20, and divided into three stages of cylindrical parts 41, 42 and 43 having diameters different from one another.

The first stage of cylindrical part 41 is positioned at a lower part of the inner cylinder 40 to be fitted in the first fitting groove 26, and a plurality of flow paths 41a having insert nets 24 is formed at the cylindrical part 41 so that water entering through the inlet port 25 of the case 20 and purified through the ion exchange resin can be guided to the discharge port 22.

In this process, the insert net 24 is formed of meshes to pass liquid therethrough and block the ion exchange resin.

In addition, the first stage of cylindrical part 41 includes guide projections 41b formed at its outer peripheral surface to guide the insertion of the inner cylinder 40 and prevent rotation of the inner cylinder 40 when the inner cylinder 40 is inserted into the case 20.

The second stage of cylindrical part 42 is formed at a center of the inner cylinder 40. The cylindrical part 42 has a diameter smaller than that of the cylindrical part 41 in order to increase the filling amount of the ion exchange resin into the inner space B when the ion exchange resin is filled into the outer space A and the inner space B defined by the partitioned cylinder 30 and the inner cylinder 40.

The third stage of cylindrical part 43 to be fitted in the second fitting groove 13 of the upper cap 10 is formed at an upper part of the inner cylinder 40. The cylindrical part 43 has a diameter smaller than that of the cylindrical part 42.

Hereinafter, operation of the embodiment in accordance with the present invention will be described with reference to FIGS. 2 to 5.

First, an ion exchange resin is filled into an outer space A and an inner space B defined by a partitioned cylinder and an inner cylinder 40 in a case 20.

At this time, the filling amount of the ion exchange resin filled into the inner space B becomes larger due to the shape of the inner cylinder 40 having three stages of cylindrical parts 41, 42 and 43 having diameters different from one another.

Specifically, the first stage of cylindrical part 41 has a diameter larger than that of the second stage of cylindrical part 42 so that the inner space B of the embodiment has a large amount of the ion exchange resin in comparison with the inner space of the conventional art 1 and 2 defined by the inner cylinder having a uniform diameter along its longitudinal direction.

Then, when an upper cap 10 is fitted on an upper part of the case 20, hooks 23 formed at a step portion 21 of the upper part of the case 20 is fitted in grooves formed at an inner peripheral surface of the upper cap 10 to maintain good sealing between the upper cap 10 and the upper part of the case 20.

Therefore, when the case 20 engaged with the upper cap 10 is installed in a water reservoir in a humidifier, water enters the outer space A of the case 20 through an inlet port 25 to fill the outer space A and the inner space B and its communication part so that the water can be ion-bonded to the ion exchange resin filled in the outer space A and the inner space B for a longer time to more effectively purify the water.

When a valve installed at a cap of the water reservoir of the humidifier is opened, the water purified in the inner space B is discharged through the discharge port 22 via a flow path 41a having an insert net 24 formed at the first stage of cylindrical part 41.

Then, the water in the reservoir enters again into the outer space A in the case 20 through the inlet port 25 according to siphon effect.

At this time, the water is supplied to a heater in the humidifier through the paths through the ion exchange resin in the case 20, thereby preventing generation of the mineral components around the heater.

In addition, air entering the cap due to exchange of water in the reservoir enters the reservoir through an air hole 12 of the upper cap 10 engaged with the upper part of the case 20 along an air flow path (not shown) formed in the inner cylinder 40.

Meanwhile, when the ion exchange resin filled in the outer space A and the inner space B in the case 20 is to be exchanged, first, the upper cap 10 is separated from the case 20.

Then, the inner cylinder 40 is separated from the case 20.

Specifically, since the first stage of cylindrical part 41 of the inner cylinder 40 has guide projections 41b, and guide ribs 50 extending perpendicular to the partitioned cylinder 30 in the case 20 are inserted between the guide projections 41b, when the inner cylinder 40 is separated from the case 20, the inner cylinder 40 can be smoothly separated therefrom.

Therefore, it is possible to conveniently exchange the ion exchange resin in the inner space B defined between the inner cylinder 40 and the partitioned cylinder 30, as well as the ion exchange resin in the outer space A defined between the case 20 and the partitioned cylinder 30.

As can be seen from the foregoing, the present invention provides a water filtering device capable of increasing the filling amount of the ion exchange resin by including a separate inner cylinder having upper and lower diameters that are different from each other, the adsorption and removal efficiency of mineral components contained in water by taking a long ionic bonding time between the water and the ion exchange resin, and effectively preventing scales of the mineral components from being extracted by heating a heater to prevent malfunction of the heater or pipes.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A water filtering device comprising:
   a case having a water inlet port and a water discharge port;
   an inner cylinder disposed in the case and providing a space between the case and the inner cylinder filled with an ion exchange resin so that water entering through the water inlet port is ion-bonded and discharged through the discharge port;
   a partitioned cylinder disposed between the case and the inner cylinder partitioning the space into an inner space toward the inner cylinder and an outer space toward the case,
   wherein the inner space and the outer space are each filled with the ion exchange resin;
   an upper cap including a center air hole, said upper end cap being detachably fitted on an open upper part of the case;
   wherein the case has a first fitting groove formed around a front end of the discharge port, the first fitting groove having a diameter larger than the second fitting groove;
   wherein a second fitting groove is formed around the center air hole in the upper end cap;
   ring shaped packing members formed of soft rubber or soft synthetic resin inserted in the first and second fitting grooves to prevent leakage; and,
   wherein upper and lower ends of the inner cylinder are detachably fitted into the first and second fitting grooves, respectively.

2. The water filtering device according to claim 1, wherein the water inlet port comprises a plurality of inlet ports disposed along a lower peripheral surface of the case.

3. The water filtering device according to claim 1, wherein the water inlet port is provided with an insert net for blocking introduction of impurities.

4. The water filtering device according to claim 1, wherein the discharge port is formed at a center of a lower surface of the case.

5. The water filtering device according to claim 1, wherein the case has a step portion into which the upper cap is fitted.

6. The water filtering device according to claim 5, wherein the step portion comprises hooks spaced by a predetermined interval to prevent separation of the upper cap after the insertion.

7. The water filtering device according to claim 6, wherein the upper cap has a predetermined number of grooves formed at its inner peripheral surface, corresponding to the hooks.

8. The water filtering device according to claim 1, wherein the partitioned cylinder is incorporated in one body with the case.

9. The water filtering device according to claim 1, wherein the partitioned cylinder has guide ribs perpendicular to each other to guide insertion of the inner cylinder.

10. The water filtering device according to claim 1, wherein the inner cylinder is divided into first, second and third stages of cylindrical parts having diameters different from one another.

11. The water filtering device according to claim 10, wherein the first stage of cylindrical part is fitted in the first fitting groove at its front end, and has a flow path provided with an insert net to guide the water entering the inner space to the discharge port.

12. The water filtering device according to claim 11, wherein the first stage of cylindrical part has guide projections formed at its outer peripheral surface to guide the inner cylinder to be readily inserted and prevent rotation of the inner cylinder on the insertion.

13. The water filtering device according to claim 10, wherein the second stage of cylindrical part has a diameter smaller than the first stage of cylindrical part to increase the filling amount of the ion exchange resin in the inner space.

14. The water filtering device according to claim 10, wherein the third stage of cylindrical part has a diameter smaller than the second stage of cylindrical part to be fitted in the second fitting groove at its front end.

* * * * *